United States Patent [19]

Brieu

[11] Patent Number: 4,535,230
[45] Date of Patent: Aug. 13, 1985

[54] VARIABLE PROFILE ROLLER PARTICULARLY FOR THE PAPER MAKING INDUSTRY

[75] Inventor: Francois M. P. Brieu, Saint-Cloud, France

[73] Assignee: Chlq Frote et Cie, Paris, France

[21] Appl. No.: 367,056

[22] Filed: Apr. 9, 1982

[30] Foreign Application Priority Data

Apr. 9, 1981 [FR] France ................................ 81 07114

[51] Int. Cl.³ .............................................. B21B 27/06
[52] U.S. Cl. ..................................... 219/470; 26/2 E; 38/44; 162/357; 219/244; 219/530; 219/469
[58] Field of Search ............... 219/216, 244, 469, 470, 219/471, 530, 540; 165/89; 38/44; 162/357; 26/2 E; 69/27; 101/416

[56] References Cited

U.S. PATENT DOCUMENTS

| 1,348,469 | 8/1920 | Alexander | 219/471 X |
|---|---|---|---|
| 1,535,608 | 4/1925 | Johnson, Jr. | 219/470 |
| 2,047,372 | 7/1936 | Jalens | 219/469 X |
| 2,777,931 | 1/1957 | Bundegaard et al. | 219/470 |
| 2,779,851 | 1/1957 | Vogt | 219/470 X |
| 2,961,733 | 11/1960 | Hart | 219/470 X |
| 3,020,383 | 2/1962 | Owishi et al. | 219/470 |
| 3,278,723 | 10/1966 | Van Toorn | 219/470 |
| 3,624,353 | 11/1971 | Bjorklund | 219/470 |

FOREIGN PATENT DOCUMENTS

| 0008814 | 3/1980 | European Pat. Off. . | |
| 1226287 | 5/1959 | Fed. Rep. of Germany | 219/470 |
| 1373349 | 8/1964 | France . | |

Primary Examiner—Volodymyr Y. Mayewsky
Attorney, Agent, or Firm—Armstrong, Nikaido, Marmelstein & Kubovcik

[57] ABSTRACT

The invention concerns variable contour rollers for use in calendering or pressing devices, printing presses and like applications. The rollers include an external element of cylindrical form, for example of cast iron, and in their interior a number of transverse elements which can be made to expand radially by heating. More or less substantial radial expansion provokes directly or indirectly a change in the profile of the exterior generally cylindrical working surface. The interior of the roller may be a shaft carrying heating elements and which is fixed or rotates with the external working surface.

5 Claims, 11 Drawing Figures

VARIABLE PROFILE ROLLER PARTICULARLY FOR THE PAPER MAKING INDUSTRY

FIELD OF THE INVENTION

The present invention relates to variable profile rollers which are used in particular in calendering or pressing devices, for example in the paper making industry.

DESCRIPTION OF PRIOR ART

Calenders designed to calibrate material in sheet or web form, notably paper, are nowadays equipped with systems for correcting their shape which are designed essentially to offset the deformation of the rollers under the action of the pressure.

For example, glazing machines are used which are formed by a mechanical assembly of several rollers piled vertically each resting horizontally on another and pressed together by means of a suitable framework. The paper emerging from coolers passes through this set of rollers with object that its natural roughness is reduced and its thickness made regular. Paper so treated is called "finished".

Accordingly systems allowing the modification of curvatures or profiles of the rollers already exist. And rollers are known in this connection which have an external rotating element bounded by an external working surface and an internal element constituting a fluid circulation circuit. The internal element which does not turn defines two chambers one of which contains a fluid under high pressure and the other fluid under low pressure. In this fashion the internal surface of the external element is pressed on one side and not on the other. The curvature of the external element can thus be modified. This system has numerous disadvantages. First of all, the use of hydraulic fluid under high pressure necessitates very elaborate sealed systems and requires tight tolerances. In consequence the price of these rollers is very substantial. Finally, the regulation obtained only bears on a relatively limited number of positions along the length of the roller in such fashion that the correction obtained is relatively crude.

Rollers comprising an external element turning around an internal fixed element are also known. This latter defines a certain number of cavities connected by hydraulic or pneumatic circuits to a suitable distribution device. Each cavity is closed on its side turned towards the internal surface of the external element, by a piston which can bear against the internal surface of the external element. The transmission of fluid under pressure in greater or lesser quantities into the various cavities permits varying curvature to be obtained over the length of the roller in a rectilinear zone of such system, one embodiment of which is described in French Patent Specification No. 1 373 349, and this also has the disadvantages of the system described above, with a possible reduction of the losses from the hydraulic or pneumatic system. However, this reduction is only obtained at the price of lower tolerances being respected during the manufacture of the seatings of the pistons.

Also known are variable profile rollers in which a certain correction of the rollers which heat up in the course of their functioning is obtained by locally blowing on to them a relatively cold gas. The local contraction of the roller provokes slight modification of the curvature.

Finally, European Patent Application Publication No. 0 008814 describes a variable profile roller comprising an external tubular element surrounding an internal cylindrical fixed element and mounted for rotation on the two ends of the latter, on which is disposed at least one heating belt extending longitudinally parallel to a generatrix of the cylindrical element and limited to a circular sector of the latter. This internal cylindrical element carries at least one electric temperature probe immediately next to the or each heating belt and at least one electrical heating probe on the side opposite the or each heating belt, this opposed side being advantageously able to be cooled on demand. The temperature probes are connected to a measuring device for measuring the difference in temperature and governing with this latter an electrical heating circuit for the or each heating belt, the heating of which is the origin of a differential longitudinal thermal expansion which is produced between the respectively heated and unheated sides of the internal element. A transverse flexure accordingly develops of this latter and this flexure is transmitted to the external tubular element by the bearings.

OBJECTS OF THE INVENTION

It is a principal object of the invention to provide a variable profile roller, particularly for calendering device, which is formed of simple and robust components, which does not need any sophisticated manufacturing, and for which control is very simple, and maintenance much reduced, whereby a reduction in both capital investment and running costs is obtained.

GENERAL DESCRIPTION OF THE INVENTION

The present invention relates to a variable contour roller of a type the general external shape of which is delimited by an external working surface which is substantially that of a cylinder around the axis of which the working surface is moved in rotation, and comprising a plurality of heating devices located along the axis of the cylinder and capable of being actuated independently of one another by an actuation element in order to determine the shape of at least a part of the external working surface and which is characterised in that each heating device is disposed transversely relative to the axis of the cylinder in such a fashion that these heating devices modify the curvature of this part at least of the external working surface by the effect of radial thermal expansion and/or contraction.

In a preferred embodiment the invention relates to a variable contour roller of a type comprising, in fashion known per se, an external tubular element driven in rotation around its axis, the external surface of which constitutes the external working surface and an internal element surrounded by the external element and with radial play separating the internal surface of the external element and the external surface of the internal element and in which the internal element constitutes a support for the heating devices.

In this case the invention concerns more precisely a variable contour roller each heating device of which cooperates with a positioning element comprising at least one elongated part constituted by a heat expandable material and located substantially radially between the internal and external elements in such a fashion that when at least one of the heating devices of a positioning element is functioning or not, this positioning element expands or contracts radially and modifies the curvature of the corresponding part of the external working surface by the application of a force on a bearing surface defined by the internal surface of the external element.

The positioning elements have, for example, the shape of discs each comprising at least one heating device and surrounding the internal element. If the heating devices are electrical and if, for example, the internal and external elements are both desired to turn together, in such a way that the curvature is then advantageously controlled over the whole of the periphery of the circumference of the roller, the internal element comprises then a shaft provided with collector rings permitting separate supplies to the heating device.

When the roller comprises internal and external elements according to another variant, which constitutes part of the invention, each heating device is an annular device surrounding the internal element and without contact with the internal surface of the exterior element and which is radially expanded or contracted by radiation or convection.

Advantageously in this variant, discs of thermally insulating material surrounding the internal element and extending radially up to the neighbourhood of the internal surface of the external element are each disposed between two adjacent heating devices.

In another embodiment the external element is designed to turn around the internal element which does not turn and the positioning elements which are held on the internal element are substantially aligned. It is then advantageous that the internal non-rotating element carries the guiding devices for the positioning elements.

For example, a shoe placed between each positioning element and the internal surface of the external element can be guided by the internal element. In a variant, the positioning element of elongate shape terminates in a roller the side of which turns against the internal surface of the external element, the roller bearing against the internal surface and transmitting thereto the forces applied by the positioning elements.

The invention is not limited to variable profile rollers comprising external and internal elements. In another possible embodiment which constitutes part of the invention the external working surface of the roller is defined by the external lateral surfaces of cylindrical discs fastened together and fixed relative to one another along the axis of revolution by at least one of their radial faces and each comprising at least one heating device.

Preferably each disc has, on one of its radial faces, at least one boss of form complementary to at least one recess provided in the other radial face of the disc, at least one boss of one of the end discs and at least one recess in the other end disc cooperating respectively with at least one recess and at least one boss provided respectively on one of the two end caps which are fixed relative to the discs and each on a portion of a shaft.

The radial expansion or contraction of the discs accordingly modifies the shape of the external working surface directly.

When the positioning elements or the discs have a very great thermal inertia, it can be advantageous if the roller comprises in addition one or more cooling devices associated with at least certain of the positioning devices or discs and if appropriate controlled also by the control element.

The cooling devices can be of various types, for example the circulation of cooling fluid or blowing of a relatively cool gas, etc.

The heating device can also be of various different types, for example one or several Joule-effect heating elements placed in thermal contact with the positioning element or disc, a direct heating element for each positioning element or disc working on the Joule effect, by circulation of electric current in the element or the disc itself, a flame heating device or a device for heating by contact with a heat-carrying fluid.

The control mechanism can be of any type known in technology for the control of the functioning of heating devices. For example, it can be an element of well known type designed to receive data representative of the thickness of the material in sheet form which is treated on the variable contour roller and to control the curvature of the roller as a function of the modification desired for this thickness.

SPECIFIC DESCRIPTION OF PREFERRED EMBODIMENT

The description which follows of preferred embodiments of the invention is made with reference to the accompanying drawings in which.

Figure 1:
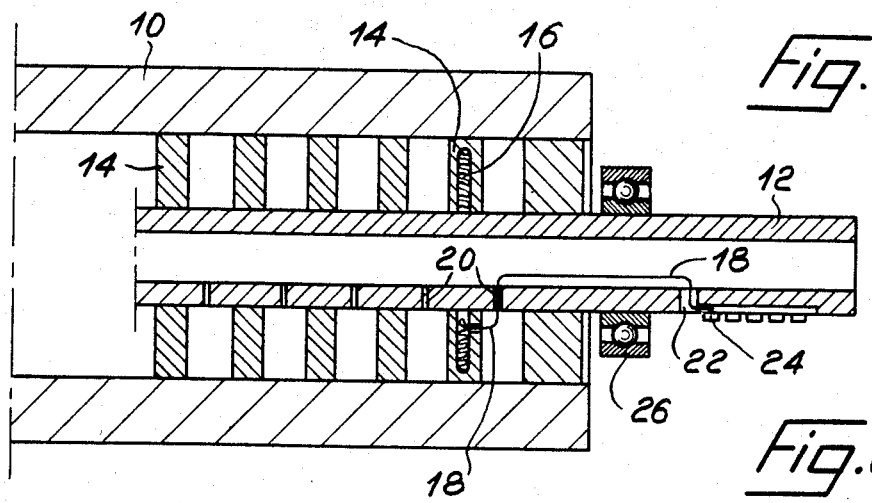
FIG. 1 is a schematic view of a first embodiment of a variable contour roller according to the invention.

FIG. 1 is a schematic section of one end of a variable contour roller according to the invention. This roller comprises essentially an external element 10 and an internal element 12. The element 10 has an external working surface which is designed for example to be in contact with a sheet or web of paper. The internal surface of the external element 10 which is in the form of a cylinder is in contact with positioning elements 14 carried by the internal element 12. Each element 14 has the form of a disc. Each disc 14 contains one or several heating devices 16 appropriately electrically insulated from the disc 14. The single device 16 or all of the heating devices 16 in a given disc 14 are fed via an electrically insulated wire 18 which passes through holes 20 and 22 formed in the wall of the internal element 12 and in the central hole of this internal element and terminates at a collector ring 24 carried on the end of the internal element 12 which extends a little further. The collector rings 24 are electrically insulated from the element 12. In this embodiment the wire 18 is connected to one end of each heating element 16 of the corresponding disc 14 and the other end of this element is earthed. However two or more wires 18 can feed the element or several elements of each disc 14.

Although the only heating element 16 shown on the drawing is in the right-hand disc as seen in FIG. 1, all the other discs 14 also have heating elements connected to a collector ring 24.

At each end, the interior element or the exterior element is carried by a bearing, here shown in the form of a simple roller bearing 26 purely as an illustrative type.

During functioning the solid assembly constituted by external element 10, internal element 12 and the intermediate discs 14 turns as a whole, either being driven by a motor fixed to the internal element 12 or to the external element 10 or by contact with a moving web treated on the roller.

If the web or belt treated has too great a thickness at any position across its breadth, this fact is detected by apparatus which does not constitute part of the body of this invention and is transmitted to a control means not shown which is associated with the variable contour roller. This control element determines which disc or discs 14 should be heated and what the amount of heating of each disc 14 should be. This central means then controls easily the intensity of current passed through the heating element or the length of time it is fed with current with the object of heating up the corresponding disc 14 which then expands, particularly in the radial direction, so that at the position of this disc, the roller tends to take up an increased diameter.

Figure 2:
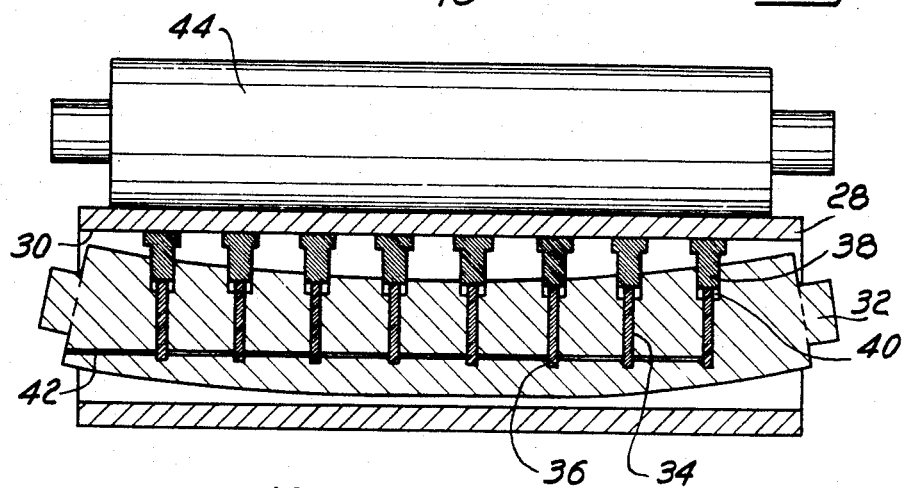
FIG. 2 is a schematic view of a second embodiment of a variable contour roller according to the invention.

FIG. 2 shows an alternative embodiment of the invention. The variable contour roller comprises an external element 28 of cylindrical shape having an external working surface designed to be in contact with the web or belt to be treated and internal bearing surface 30. The internal element 32 is fixed. It has been drawn with a substantially cylindrical form so that it has an elevated mechanical resistance. However, it has also been indicated that it has a slightly rounded form, not because it is machined in this shape but because under the action of the forces applied by the positioning element, it has a tendency to take up such a shape, although the deformation has been exaggerated in the drawing of FIG 2. The fixed element 32 houses thus, in transverse bores 34 elongated positioning elements 36. The outer end of each of these latter bears on a shoe 38 which can slide in a chamber 40 formed adjacent the surface of the internal element 32.

Although this has not been drawn, heating elements are of course incorporated in the positioning elements 36. However, the elements 36 themselves can constitute heating elements, for example by the direct circulation of a current in their interior. Channels 42 provided with a passage of electrical wires to feed the heating elements of positioning elements 36 have been indicated.

The shoes 38 have an external surface which is in contact with the bearing surface 30 of the external element 28 which matches the cylindrical surface and they are advantageously formed of a material having a low coefficient of friction.

The drawing also shows a roller 44 which is designed to cooperate with the variable contour roller according to the invention, for example in a finisher.

Figure 3:
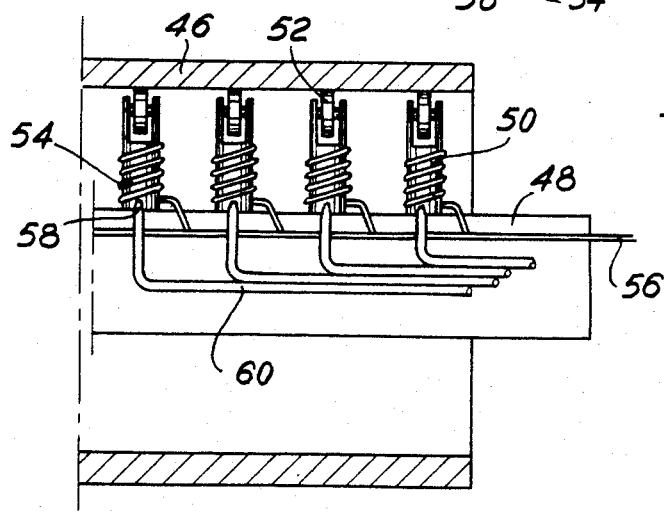
FIG. 3 shows a variant of the roller of FIG. 2.

FIG. 3 shows a variant of the roller of FIG. 2. More particularly this roller comprises an external rotating element 46 of cylindrical shape, a fixed internal element 48 and positioning elements 50. The externakl end of each element 50 has the form of a fork and carries a rotating wheel 52 designed to transmit to the internal surface of element 46 the forces which are transmitted to it by the positioning element 50.

There has also been shown in schematic form a heating device 54 associated with each element 50 and connected by wires 56 to a suitable control means.

Reference 58 denotes an air blowing nozzle which is associated with each positioning element. This nozzle is connected by pipework 60 to a supply of relatively cold gas, for example air at ambient temperature.

During the functioning of the roller of FIG. 2 or that of FIG. 3, when the heating devices of different positioning elements function, the corresponding positioning element is pressed against the internal surface of the external element so that a greater force tends to be applied by the external surface towards the counter-roller, as in the embodiment of FIG. 1. However the forces are only applied substantially along a generatix, i.e. directly towards the counter-roller.

Furthermore, in the variant of FIG. 3, if it is determined that the thickness of the web or belt of material being treated by the roller becomes insufficient at a region and that the positioning element is not contracting sufficiently quickly a current of air may be transmitted by the corresponding nozzle 58 in order that this contraction of the positioning element may be accelerated. Thus, the embodiment of FIG. 3 has a sensitivity greater than that of the embodiment of FIG. 2. It should however be noted that one can also use appropriate cooling devices in the embodiments of FIGS. 1 and 2.

Figure 4:
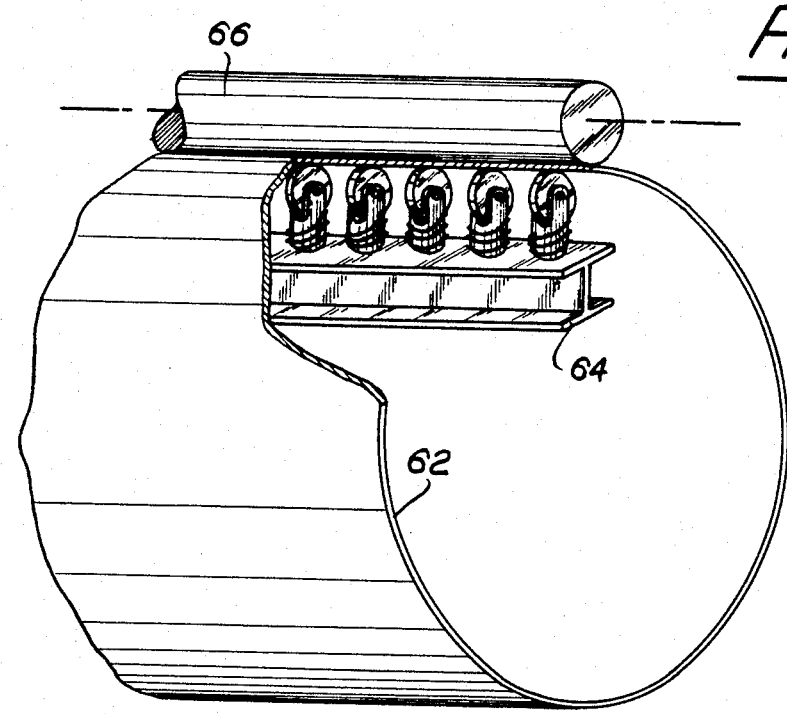
FIG. 4 shows another variant of the roller of FIG. 2.

FIG. 4 shows another variant very similar to that of FIG. 3. The essential difference is in the fact that the external element this time is of a very much smaller thickness and accordingly has greater flexibility. The internal element has been shown as a fixed element in the form of a simple girder 64. In this variant the material passes between the external element 62 and a roller 66. The external element 62 in this embodiment can have a small thickness. The profile given by the rollers can be very different from a straight line profile. In addition, the external element 62 can have a cross section which is otherwise than circular, having regard to its substantial flexibility.

In the different embodiments of the invention considered heretofore the external element is advantageously in the form of a jacket or casing formed of steel or cast iron. The positioning elements are advantageously formed of a material having a relatively large co-efficient of linear expansion, for example brass, bronze or various copper based alloys. Having regard to the good thermal conductivity of these materials the sensitivity of control is increased.

Figure 5:
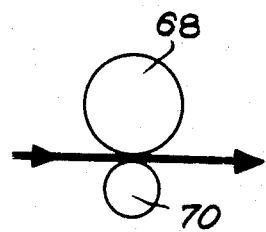
FIGS. 5 to 9 are illustrative schematic drawings showing various mountings of the variable contour roller according to the invention.
Figure 6:
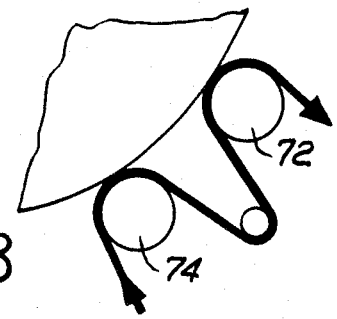

Several examples of calendering apparatus in the form of calenders or finishers will now be considered which can comprise one or more variable contour rollers according to the invention. FIG. 5 shows the simple passage of a material in web or belt form through the nip between two rollers 68,70. It is advantageous if only one of the rollers such as 68 is of the type according to the invention, but both can be of variable contour. FIG. 6 shows an embodiment in which it is normally sufficient that one only of rollers 72 and 74 which are placed in contact with a larger roller is of the type according to the invention. Preferably it should be roller 72 which is located on the exit side of the web.

Figure 7:
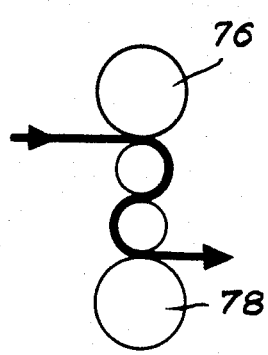

FIG. 7 shows a standard mounting in which the roller according to the invention takes up one of the positions 76, 78 or both of them.

Figure 8:
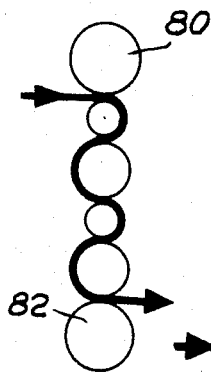

FIG. 8 shows a variant of the apparatus of FIG. 7 in which the web or belt passes through five nips. It is sufficient that the two end rollers 80, 82 are constructed according to the invention.

Figure 9:
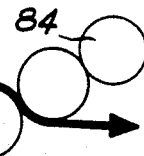

Finally, FIG. 9 shows another use possibility in which the roller 84 according to the invention is not directly in contact with the web or belt to be treated. It simply presses on a neighbouring roller which is itself in contact with the web.

The invention is not limited to the embodiments in which the positioning elements cooperating with heating devices come into contact with a bearing surface which constitutes the internal surface of the external rotating element, the external surface of which defines the working surface of the roller.

Figure 10:
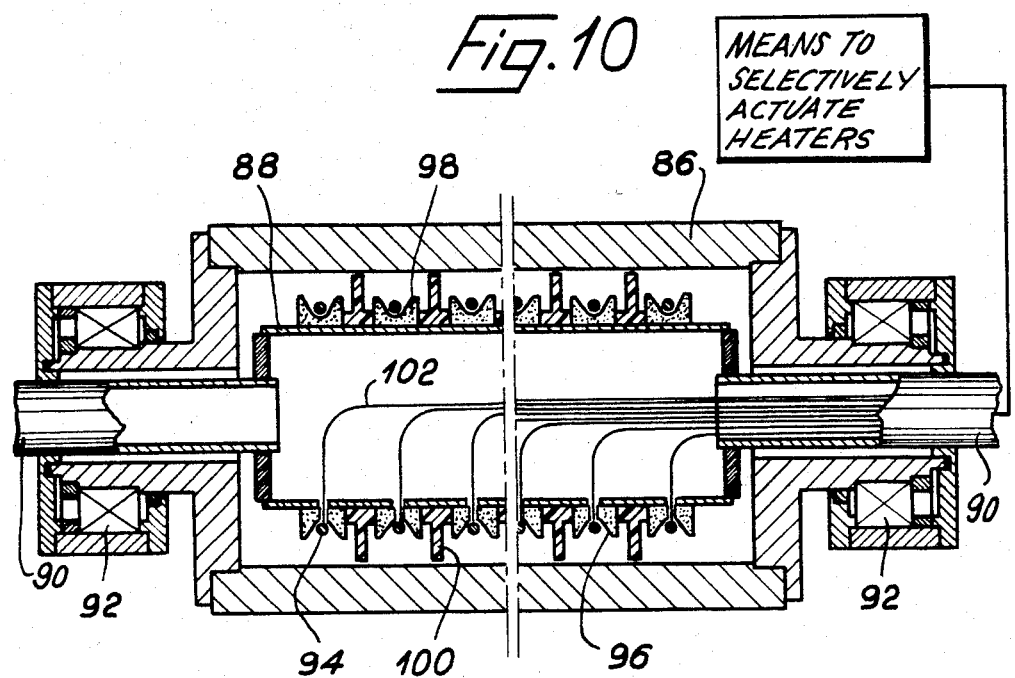
FIGS. 10 and 11 are schematic sections of a third and fourth embodiment respectively of the variable contour roller according to the invention.

In effect, in the embodiment shown in FIG. 10, an external element 86 is shown constituted essentially by a hollow cylinder surrounding an internal tubular element 88 and mounted for rotation around the latter which is fixed by two end supports (not shown) on which the two trunnions of the shaft 90 which is fixed relative to the internal element 88 are anchored, thanks to two bearings 92 which are shown in the form of roller bearings which simultaneously function as axial stops and which conform to well known mountings which it is not necessary to describe further. The independent heating devices, each constituted by an armoured electrical resistance in the form of an annulus 94 which is received in a cavity 96 open towards the lateral face of annular support element 98 which is made in an insulating or conducted material, are mounted around the internal tubular element 88 and regularly spaced longitudinally on the latter in the space which separates the external surface of the internal element 88 and the internal surface of the external element 86. Discs 100 of thermally insulating material are interposed between each two adjacent heating devices and they extend radially up to the neighbourhood of the internal surface of the external element 86 in such a way as to delimit precisely on this latter adjacent annular surface bands which are susceptible to being heated up by radiation and convection produced by the heating devices located radially internally in corresponding fashion. Each armoured resistance 94 is fed by an electric wire 102 which crosses support 98 corresponding to the wall of the internal tubular element 88 and extending axially in this latter and across a trunnion of the end shaft 90 towards the control means (not shown). In this embodiment, it is accordingly the wall of external element 86 which dilates and contracts directly under the effect of the heating devices with which the external element 86 has no actual contact.

In FIG. 10 the radial distance separating each armoured resistance 94 and each support 98 from the internal surface of the external element 86 has been substantially exaggerated with the object of clarity in the drawing but it should be understood that in reality this radial distance is small.

Figure 11:
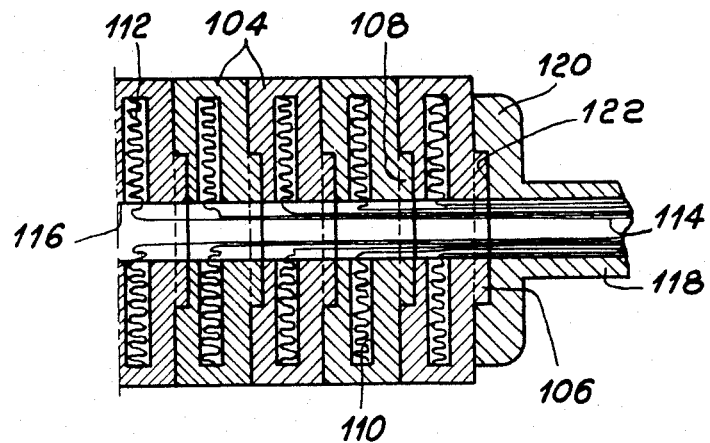

In FIG. 11, another embodiment is shown in which the variable contour roller is substantially constituted by several identical cylindrical discs 104 made of a material having a good thermal expansion co-efficient which are fastened together and fixed one relative to another for example by bolting along their faces which are radial relative to the axis of rotation of the roller which are co-axial with the axes of the discs 104. The height of each disc 104 has on one of its radial faces a cylindrical coaxial boss 106 of shape complementary to a cylindrical co-axial recess 108 machined in the other radial face of the disc 104 in such a fashion that in the assembled position each disc 104, save for the two located at the ends of the set of discs, has its boss 106 received in the recess 108 of the adjacent disc on one side and receives in its recess 108 the boss 106 of the adjacent disc on the other side.

Excellent relative positioning of the discs 104 is accordingly obtained, the external lateral surfaces of which constitute the continuous external working surface of the roller. An annular chamber 110 machined in each disc 104 receives a heating device comprising an armoured electrical resistance 112 fed by a wire 114 which emerges radially into the central bore 116 of the corresponding disc 104 and extends axially into one of the two end portions of the shaft 118 by means of which the roller is mounted for rotation. Each of the shaft portions 118 is integral with an end cap such as 120 which is fixed to one end of the set of discs 104. One of the end caps 120 has on its radial face directed towards the discs 104 a co-axial cylindrical recess 122 in which the boss 106 of the end disc 104 at the corresponding end of the set is received while the other cap (not shown) is provided on its radial face directed towards the discs 104 with a co-axial cylindrical boss which is received in the recess 108 of the disc at the other corresponding end of the assembled set of discs 104. In this embodiment the radial thermal contractions and expansions of the disc 104 determine directly the profile of the working surface of the roller.

Although electrical control of the heating of the positioning elements has been described, other systems may also be used. For example, when the positioning elements receive a heat carrying fluid, the flow of fluid into each element can be remotely controlled. This arrangement permits using a reservoir of fluid at a single temperature. However, the temperature of each element can also be regulated by control of the temperature of fluid which circulates in it. In one advantageous embodiment each positioning element comprises a fluid circuit arranged as a branch relative to a principal circuit and a servo valve or electromagnetic valve associated with each element and controlled by electrical signals is provided with the object that the fluid circulates or does not circulate in the respective circuit in each element.

Thus, the invention relates to variable contour rollers which are very sensitive, very effective and not too expensive having regard to the simple mechanical realisation of the different elements. No operation necessitates respect for narrow tolerances. In particular the positioning elements can be mounted in adjustable fashion, for example simply by being screw fitted into threaded holes. In this fashion, the initial setting up of the positioning elements can be easily effected.

Although the invention has been described with reference to the manufacture of sheets or webs of paper, it has other application in different areas where rollers are used, for example in laminating, printing and pressing. The rollers can also be used for treating webs or strips of aluminium, iron, glass or textiles for example. They may also be used in printing presses, notably for inking rollers.

It is of course to be understood that the invention has only been described and shown by way of preferred examples and that any equivalent technical means can be applied to its constituent elements without for that reason departing from the broad scope of the invention.

I claim:

1. A variable contour roller comprising an external hollow cylindrical jacket made of a heat expandable material mounted for rotation about its axis and a stationary internal member, the internal member including support means, successively space along the axis of said cylindrical member alternate discs of thermally insulating material and electric resistance radiant heaters mounted on said support means, the discs of thermally insulating material extending substantially wholly radially across the interior of hollow cylindrical member and the heaters being selectively actuatable to heat selected ring-shaped regions of said exterior cylindricakl member.

2. A variable profile roller for use in calendering or a pressing device against at least one other roller with constant profile, comprising a tubular element having a substantially cylindrical outer working surface made of a heat expandable material divided into successive axial sections by thermal insulating internal radial walls, and internal heating means mounted on stationary means and spaced apart along the axis of said roller in corrspondence with said sections wherein said heating means are independently controlled converting local heating into local radial expansion of the outer working surface of the corresponding section.

3. The roller of claim 2 wherein said heating means are electric resistance heating devices.

4. The roller of claim 2 wherein an internal fixed element is located inside said external tubular element and wherein each heating means is an annular element surrounding said internal element.

5. The roller of claim 2 wherein each thermal insulating radial wakll is a disc surrounding said internal element and extending radially up to the neighborhood of the internal surface of the external tubular element, each disc being disposed between two adjacent heating devices.

* * * * *

UNITED STATES PATENT AND TRADEMARK OFFICE
CERTIFICATE OF CORRECTION

PATENT NO. : 4,535,230
DATED : August 13, 1985
INVENTOR(S) : FRANCOIS M. P. BRIEU It is certified that error appears in the above-identified patent and that said Letters Patent is hereby corrected as shown below:

On the cover page, Item [73], change "Chlq" to --- Chleq ---.

Signed and Sealed this

Third Day of June 1986

[SEAL]

Attest:

Attesting Officer

DONALD J. QUIGG

Commissioner of Patents and Trademarks